(12) United States Patent
Law et al.

(10) Patent No.: US 8,102,169 B2
(45) Date of Patent: Jan. 24, 2012

(54) CABLE TRACING SYSTEM AND METHOD FOR CABLE MANAGEMENT

(75) Inventors: Douglas A. Law, Chapel Hill, NC (US); Thomas S. Mazzeo, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 12/180,404

(22) Filed: Jul. 25, 2008

(65) Prior Publication Data

US 2010/0019755 A1    Jan. 28, 2010

(51) Int. Cl.
*G01R 19/00* (2006.01)

(52) U.S. Cl. .......... 324/66; 174/84 R; 174/112; 385/101

(58) Field of Classification Search ............... 324/66
See application file for complete search history.

(56) References Cited

U.S. PATENT DOCUMENTS

| | | | | |
|---|---|---|---|---|
| 3,609,538 | A * | 9/1971 | Schag | 324/66 |
| 4,528,420 | A * | 7/1985 | Kish et al. | 174/112 |
| 5,666,453 | A * | 9/1997 | Dannenmann | 385/101 |
| 6,596,943 | B1 * | 7/2003 | Ward | 174/112 |
| 6,650,384 | B2 * | 11/2003 | Oguchi et al. | 349/86 |
| 6,906,505 | B2 * | 6/2005 | Brunet et al. | 324/66 |
| 7,029,137 | B2 | 4/2006 | Lionetti et al. | |
| 7,038,135 | B1 * | 5/2006 | Chan et al. | 174/84 R |
| 2003/0091871 | A1* | 5/2003 | Yamazaki et al. | 428/698 |
| 2008/0115957 | A1* | 5/2008 | Duffy et al. | 174/112 |

FOREIGN PATENT DOCUMENTS

| | | |
|---|---|---|
| DE | 3742412 | 6/1989 |
| WO | 2006044177 A2 | 4/2006 |
| WO | WO 2006/044177 A2 * | 4/2006 |

OTHER PUBLICATIONS

Definition of "probe", Merriam Webster Online Dictionary (http://www.merriam-webster.com, copyright 2010, Merriam-Webster, Inc.*

* cited by examiner

*Primary Examiner* — Melissa Koval
*Assistant Examiner* — Benjamin M Baldridge
(74) *Attorney, Agent, or Firm* — Steven M. Greenberg, Esq.; Carey, Rodriguez, Greenberg & O'Keefe

(57) ABSTRACT

Embodiments of the present invention provide a system, method and testing apparatus for providing, managing and tracing connective cables in electrical and information management systems. In an embodiment of the invention, a selectable tracer cable system can be provided. The selectable tracer cable system can include a cable having a first terminal end and a second terminal, a display member capable of changing states of appearance in response to an applied voltage, where the display member is disposed between the first and second terminal ends, an interface device configured to provide an electrical connection between the display member and a power supply and a core member disposed within the cable and extending from the first terminal end to the second terminal end. The display member can include a first conductive plane, a second conductive plane opposite the first conductive plane, and a plurality of color microcapsules disposed between the first conductive plane and the second conductive plane.

17 Claims, 3 Drawing Sheets

CABLE TRACING SYSTEM AND METHOD FOR CABLE MANAGEMENT

BACKGROUND OF THE INVENTION

1. Statement of the Technical Field

The present invention relates to connective cables and more particularly to tracing cables and cable management in information handling systems.

2. Description of the Related Art

The widespread introduction of computing and communication devices is rapidly increasing the need for communication interconnections. Information handling systems can include a variety of hardware and software components that can be configured to process, store and communication information, and can include one or more computer systems, data storage systems, and networking systems. As the density of these information handling systems increases, managing the cables that connect the various systems and components becomes a problem. Tracing electrical cables when they are routed from one point to another, through long distances and/or while other identical cables of the same type surround them, can be a time consuming challenge. It is common to see workers or technicians slowly following a cable from one place to another by contacting it hand-over-hand, digging into bundles with their fingers to keep contact with the specific cable, and the like. It is not unusual for these workers to lose track of the cable when, for example, the cable takes an unexpected turn, goes through a narrow passage, or when the worker tracing the cable just loses concentration for a moment.

Such tracing activities occur when routing cables through channels, inside suspended ceilings, under raised floors in information technology (IT) centers and labs, and during the configuration and integration of complex computer systems in racks by a computer manufacturer. For example, computer servers, when installed and configured into racks, have numerous cables that interconnect the servers, switches, Product Development Units (PDU), and other system devices. Cable management remains an important issue. Conventional methods to handle this issue are to use cables with specific colored jackets or manually apply printed labels that indicate point-to-point wiring. However, this process is labor intensive in the manufacturing environment and once the customer receives the configured server solution, maintenance can be difficult if the need to trace cabling should arise. Moreover, cable labels add additional complexity as new cables are added or moved in the systems, and applied cable labels can fall off. Use of color-coded cables increases the number of part numbers and thereby increases inventory complexity and related costs.

SUMMARY OF THE INVENTION

Embodiments of the present invention address deficiencies of the art in respect to connective cables and cable management and provide a novel and non-obvious system, method and testing apparatus for providing, managing and tracing connective cables in electrical and information management systems. In an embodiment of the invention, a selectable tracer cable system can be provided. The selectable tracer cable system can include a cable having a first terminal end and a second terminal, a display member capable of changing states of appearance in response to an applied voltage, where the display member is disposed between the first and second terminal ends, an interface device configured to provide an electrical connection between the display member and a power supply and a core member disposed within the cable and extending from the first terminal end to the second terminal end.

In one aspect of the embodiment, the display member includes a first conductive plane, a second conductive plane opposite the first conductive plane and a plurality of color microcapsules disposed between the first conductive plane and the second conductive plane. In another aspect of the embodiment the plurality of color microcapsules are electronic ink microcapsules.

In another preferred embodiment of the invention, a method for tracing connective cables in electrical and information handling system is provided. The method for tracing connective cables can include providing a selectable tracer cable system, coupling a power supply to an interface device coupled to a first terminal end of the selectable tracer cable system, applying a voltage to a first conductive plane of a display member to cause a plurality of color microcapsules to change the state of appearance of the display member and generating a display pattern wherein the display pattern is one of a partial stripe, a dashed line, a partial ring, a ring, a symbol, text, a figure, an image and a diagram. The method further can include applying a second voltage to the first conductive plane of a display member to cause the plurality of microcapsules to reset the state of appearance of the display member.

In yet another preferred embodiment of the invention, a tracer tool includes a housing, a power supply coupled to the housing, a power supply controller electrically coupled to the power supply and configured to manage the output signal generated by the power supply, at least one probe electrically coupled to the power supply and configured to conduct the output signal generated by the power supply and a display panel coupled to the housing and electrically coupled to a microprocessor.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
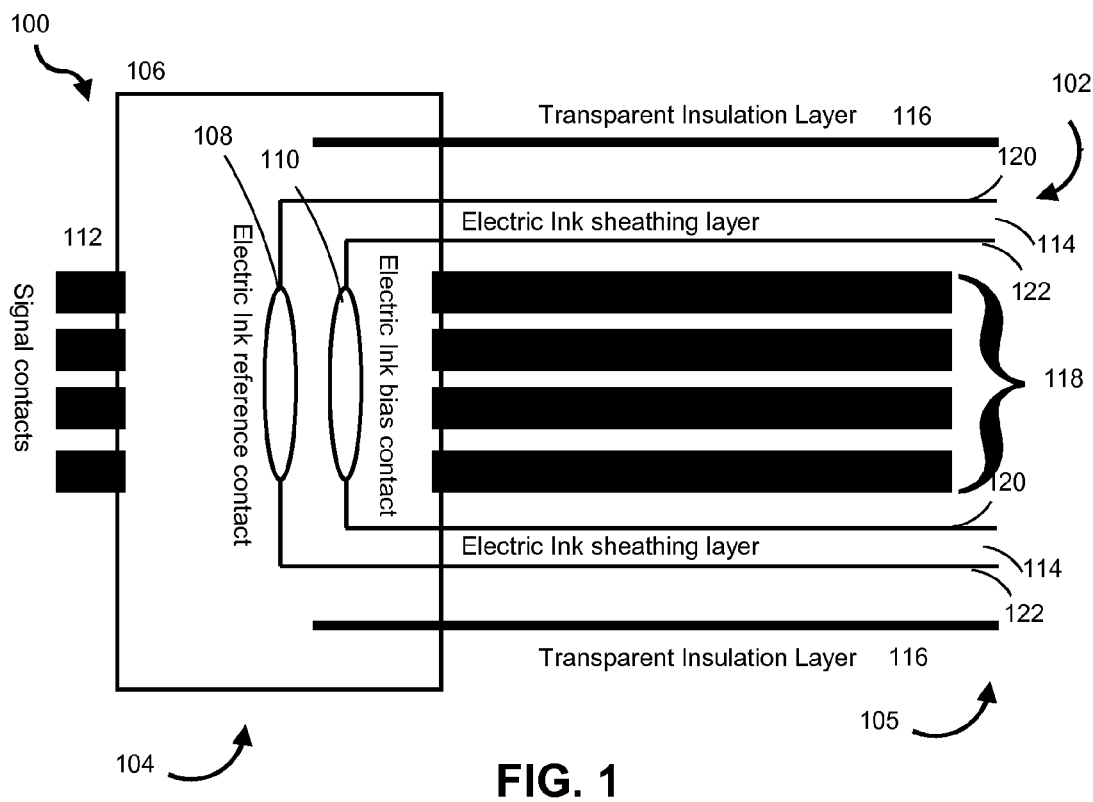
FIG. 1 is a schematic illustration of a selectable tracer cable system that utilizes a display element to provide for the tracing of cables in an information handling system that is constructed in accordance with an embodiment of the present invention.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system can be a personal computer, a network storage device, or any other suitable device and may vary in size, shape, performance, functionality, and price. The information handling system can include random access memory (RAM), one or more processing resources such as a central processing unit (CPU) or hardware or software control logic, ROM, and/or other types of nonvolatile memory. Additional components of the information handling system can include one or more disk drives, one or more network ports for communicating with external devices as well as various input and output (I/O) devices, such as a keyboard, a mouse, and a video display. The information handling system also can include one or more buses operable to transmit communications between the various hardware components.

For example, a simple storage area network (SAN) can have multiple host servers, including storage and processors, and several arrays also connected to several switches. This illustrates how a substantial number of connective cables can exist in a single installation. The cables can be individual cables or can be a bundle of cables, described below. Some of the cables can be optical cables, which however, may be indistinguishable from SAN cables in the same network, as may be power cables and Ethernet cables. A SAN also can include cables that are power cables. Thus, the problem of identifying and tracing cables is apparent. In further illustration, an information handling system may include multiple pairs of side-by-side racks and these racks can include switches, arrays and servers. These multiple racks can be spaced apart by several feet and therefore compound the identification and tracing of cables at the rear of racks.

Embodiments of the present invention address deficiencies of the art in respect to connective cables and cable management and provide a novel and non-obvious system, method and testing apparatus for providing, managing and tracing connective cables in electrical and information management systems. In accordance with an embodiment of the present invention, a selectable tracer cable system can be provided. The selectable tracer cable system can include a cable having a first terminal end and a second terminal end. The selectable tracer cable system can include a display member capable of changing states of appearance in response to an applied voltage, where the display member is disposed between the first and second terminal ends. In addition, the selectable tracer cable system can include an interface device that can be configured to provide an electrical connection between the display member and a power supply. The selectable tracer cable system further can include a core member disposed within the cable and extending from the first terminal end to the second terminal end. The display member can include a first conductive plane and a second conductive plane opposite the first conductive plane. The display member further can include a layer of electronic ink, which can be a plurality of color microcapsules disposed between the first conductive plane and the second conductive plane.

In accordance with another embodiment of the present invention, a method for tracing connective cables in electrical and information handling system is provided. The method for tracing connective cables can include providing a selectable tracer cable system, coupling a power supply to an interface device coupled to a first terminal end of the selectable tracer cable system, applying a voltage to a first conductive plane of a display member to cause a plurality of color microcapsules to change the state of appearance of the display member and generating a display pattern.

In accordance with yet another embodiment of the present invention, a tracer tool includes a housing, a power supply coupled to the housing, a power supply controller electrically coupled to the power supply and configured to manage the output signal generated by the power supply, at least one probe electrically coupled to the power supply and configured to conduct the output signal generated by the power supply and a display panel coupled to the housing and electrically coupled to a microprocessor In illustration, FIG. 1 is a schematic illustration of a selectable tracer cable system that utilizes a display element to provide for the tracing of cables in an information handling system. The selectable tracer cable system 100 can include a cable 102 having a first terminal end 104 and a second terminal end 105. The selectable tracer cable system 100 can include a display member 114 that is capable of changing states of appearance in response to an applied voltage. The display member 114 is disposed between the first 104 and second 105 terminal ends. In addition, the selectable tracer cable system 100 can include an interface device 106 that can be configured to provide an electrical connection between the display member 114 and a power supply (not shown). In embodiments, the interface device 106 can be a connector that has a pair of contact points 108, 110 located on the outside of the connector, which can provide for a voltage bias contact and a voltage reference contact for the display member 114. The location of the contact points 108, 110 external to the connector provides that the connector pin geometry of currently deployed cables will not require modification in order for the selectable tracer cable system 100 to be used in deployed information handling and/or electrical systems. The selectable tracer cable system 100 further can include a core member 118, e.g., a conductive or fiber line, disposed within the cable 102 and at least partially extending from the first terminal end 104 to the second terminal end 105. The display member 114 can include a first conductive plane 120 and a second conductive plane 122 opposite the first conductive plane 120. The display member 114 further can include a plurality of color changeable microcapsules 200 (FIG. 2) disposed between the first conductive plane 120 and the second conductive plane 122.

Figure 2A:
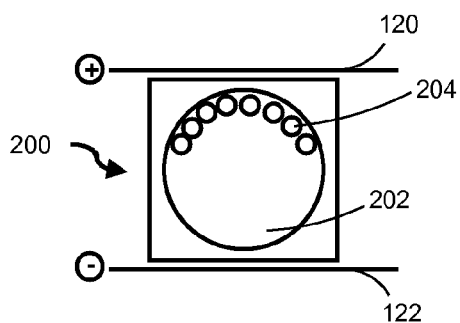
FIGS. 2A and 2B are block diagrams illustrating an electric ink sheathing layer constructed in accordance with an embodiment of the present invention.
Figure 2B:
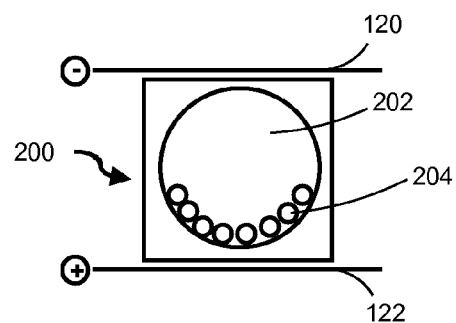

In embodiments, the display member 114 can include a sheathing layer of electronic ink. In further illustration, FIGS. 2A and 2B are block diagrams illustrating an electric ink sheathing layer 114 according to one embodiment of the present invention. In general, electronic ink is an ink that includes millions of tiny microcapsules or cavities 200 which are filled with an ink, color dye or similar oily substance 202. Each of the microcapsules 200 can be filled with a plurality of pigmented chips or microscopic balls 204. The pigmented chips or microscopic balls 204 can include a negative charge. The microcapsules 200 are about 100 microns wide, and an area of one square inch can contain roughly 100,000 microcapsules. Each of the microcapsules 200 can contain hundreds of the smaller pigmented chips or microscopic balls 204. In an embodiment, the smaller pigmented chips 204 can be white and the ink, color dye or suspension oil 202 can be blue. It is contemplated that the ink 202 and the pigmented chips or microscopic balls 204 can include a wide variety of colors, e.g., black, red, magenta, white and the like. In operation, when an electrical charge is applied to the microcapsules, the pigmented chips 204 will either rise to the top or be pulled to the bottom of the microcapsules 200. When pushed to the top, the pigmented chips 204 make the microcapsules 200 appear to be one color, e.g., white, and when the pigmented chips 204 are pulled to the bottom, the viewer only sees the ink 202, another color, e.g., red. Patterns of colors, e.g., white and dark, can then be created to form words, sentences and symbols. In embodiments, the microscopic balls 204 can be one color, e.g., black, on one side and another color, e.g., white, on the opposite side. In this embodiment, these microscopic balls 204 would also respond to an electrical charge, which rotates the microscopic balls 204 from black to white to produce words, phrases and other patterns.

Figure 3A:
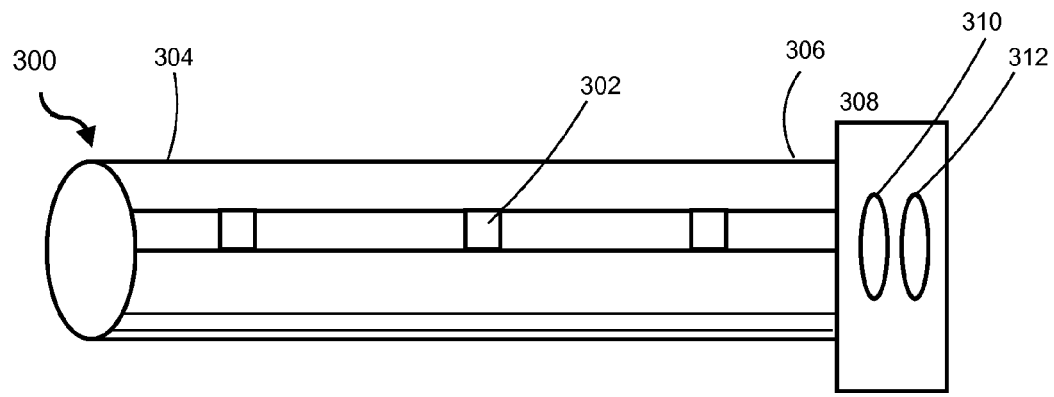
FIG. 3A is a block diagram illustrating a selectable tracer cable system that utilizes a display element that provides a dashed line along the length of the cable system, which is constructed in accordance with an embodiment of the present invention.
Figure 3B:
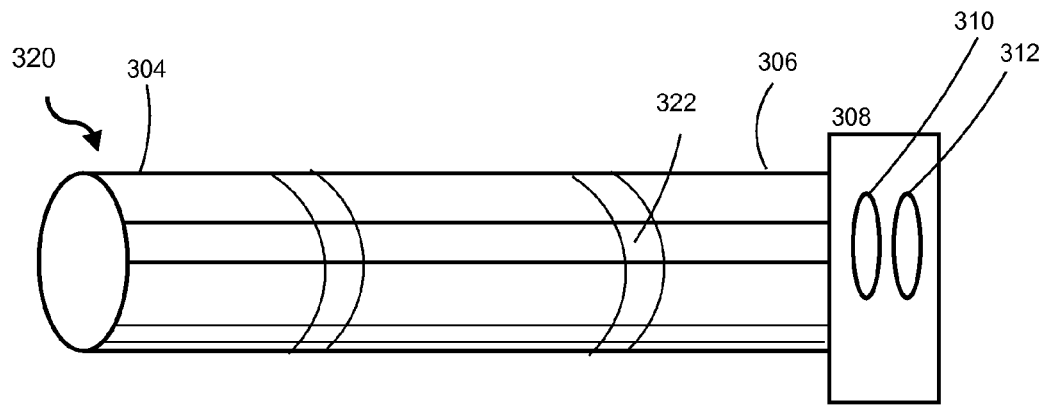
FIG. 3B is a block diagram illustrating a selectable tracer cable system that utilizes a display element to provide multiple full rings along the length of the cable system, which is constructed in accordance with an embodiment of the present invention.
Figure 3C:
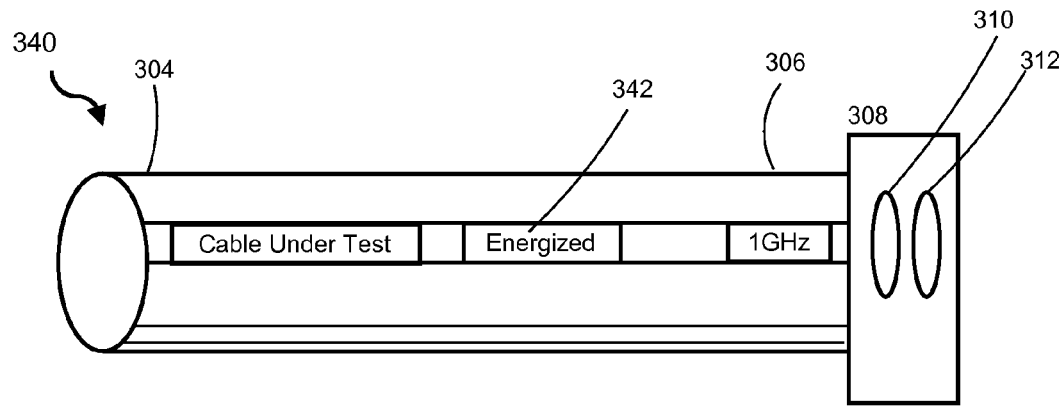
FIG. 3C is a block diagram illustrating a selectable tracer cable system that utilizes a display element that provides words and/or phrases along the length of the cable system, which is constructed in accordance with an embodiment of the present invention; and, FIG. 4 is a flowchart illustrating a process for tracing cables that utilizes the selectable tracer cable system of FIG. 1.

An important property or feature of electronic ink is it is a bi-stable material and as such, electronic ink only requires the application of power when it is desirable to change the state of the electronic ink, e.g., from a first color or pattern to a second color or pattern. Accordingly, a cable identification configured or set up with electronic ink will be preserved in the absence of any applied power. So for situations where cable identification is set up by driving logic in the device that is connected to the cable, the identification will persist even if the driving device no longer has a power source. For example, in one described application, a communication adapter sets an indication on a cable describing the Ethernet speed (e.g. 100 MHZ or 1 GHZ) supported, and if the cables are being rerouted, with the driving hardware turned off, the cables will still display the speed indicator for each cable because of the electric ink's persistence. In those circumstances where the cables need to be rerouted to specific switches based on Ethernet speed of the adapter driving the cable, the continued display of the speed indicator is important. Notably, the application of the electronic ink layer would not necessarily cover the entire cable. Instead, in embodiments, the plurality of color microcapsules 200 can be dispersed between the first and second conductive planes 120, 122 or boundaries of the electronic ink layer to generate a display pattern. The display pattern can include a partial stripe, a dashed line 302 (FIG. 3A), a partial or full ring 322 (FIG. 3B), a word 342 (FIG. 3C), e.g., "HOT" or "Powered", a symbol, and a text phrase 342 (FIG. 3C), e.g., "Cable under Test", "100 MHZ" or "1 GHZ" or any other figure, image or diagram.

In embodiments, the text, image, etc of a display pattern of the selectable tracer cable system 100 also can be selectable. For example, the three text items of FIG. 3C, "Cable under Test", "Energized" and "1 GHZ" can be located on three different electronic ink areas of electronic ink layers 114. Each of the three different electronic ink areas can have a set of contact points 108, 110. In this matter, the selectable tracer cable system 100 can provide for more combinations of patterns and colors to help trace a cable under test. In embodiments, a display pattern, such as a figure, image, text, diagram and the like, can be printed with fixed ink on top of the electronic ink layer using colors that match one of the colors that the cable sheathing can present. In this way, text can selectively appear or disappear depending on the current color of the electronic ink background. In other words, one display pattern or message appears when a positive bias is applied to the electronic ink layer, and a second, different display pattern or message appears when a negative bias is applied to the electronic ink layer. For example, a cable has a series of white circles and black rectangles permanently printed upon an electronic ink background layer that can turn white or black depending upon bias polarity. In a first state, the electronic ink background layer can be white such that the permanent black markings, e.g., the rectangles, are visible. Consequently, in a second state, the electronic ink background layer can be black such that the permanent white markings, e.g., the circles, are visible. In other embodiments, a single display pattern can appear or disappear depending on the current color of the electronic ink background. The use of a single display pattern printed with fixed ink on top of the electronic ink layer would be less expensive to manufacture than having the display pattern itself be formed from electronic ink and the need for all the display pattern components having to be connected individually to a bias voltage.

Figure 4:
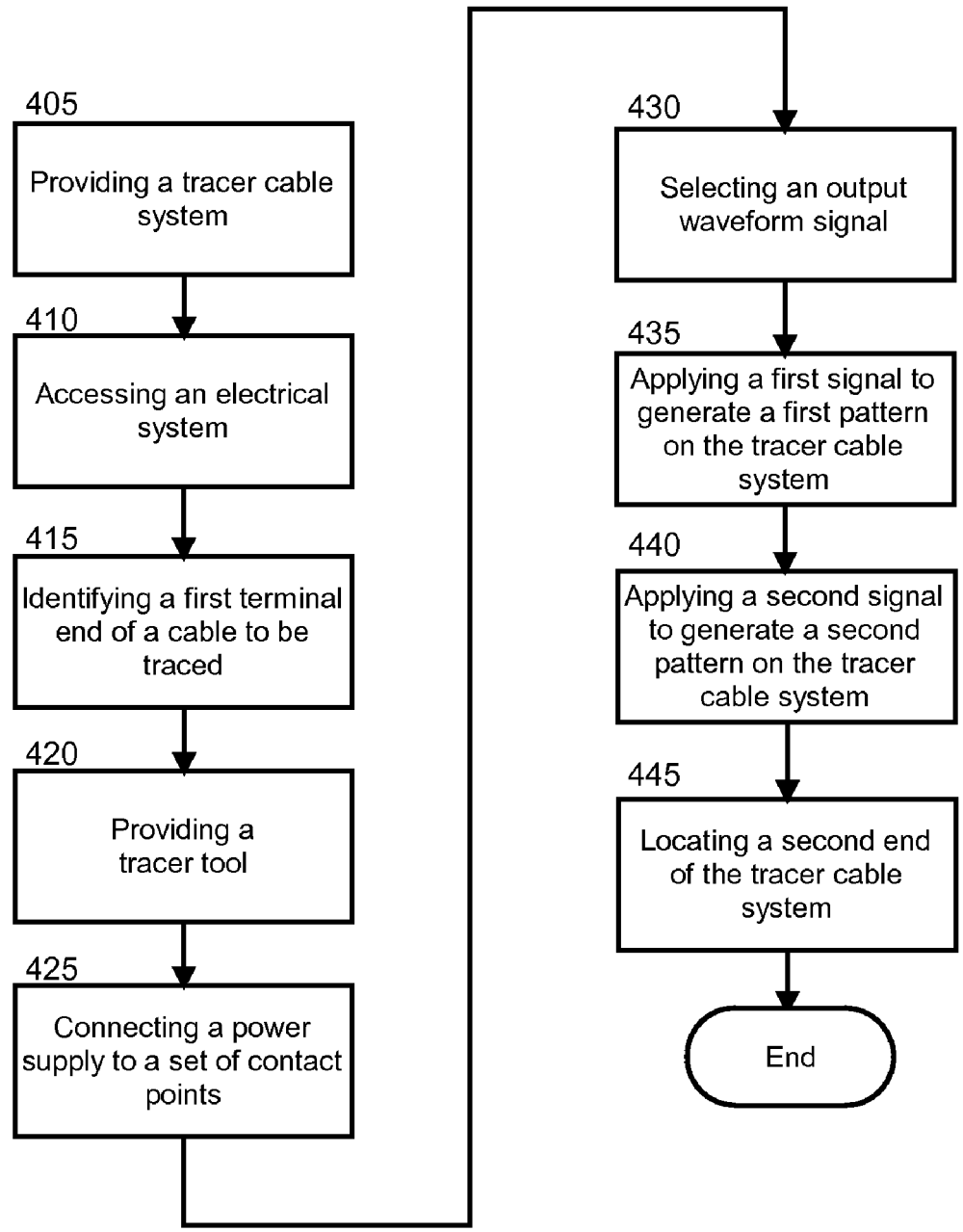

In further illustration, FIG. 4 is a flowchart illustrating a process for tracing cables in an electrical and/or information handling system that utilizes the selectable tracer cable system of FIG. 1. In block 405, one or more selectable tracer cable systems 100 can be provided in an electrical and/or information handling system. In block 410, an electrical and/or information handling system can be accessed, e.g., a rear access portion of a rack of an information handling system, and in block 415, a first terminal end 104 of one of the selectable tracer cable systems 100 can be identified for testing. In block 420, a tracer tool, e.g., a hand-held tester device can include a power supply, a power supply controller, one or more contact probes or clips, a display and a microprocessor, can be provided. In block 425, the power supply of the tracer tool can be coupled to one or more contact points of one of the selectable tracer cable systems 100. The connection can be made by use of a probe or a clip that makes sufficient electrical contact with the contact points of the one of the selectable tracer cable systems 100. In block 430, an output waveform signal of the power supply can be selected and in block 435 the selected output waveform signal can be applied to generate a first display pattern in the selectable tracer cable system 100. For example, the first display pattern could be a static display pattern, such as setting the color of the display member from red to green or energizing the electric ink layer to display a dotted line along a portion of the length of the selectable tracer cable system 100. Alternatively, the first display pattern could be a partial or full ring 322 (FIG. 3B), a word 342 (FIG. 3C), e.g., "HOT" or "Powered", a symbol, a text phrase 342 (FIG. 3C), e.g., "Cable under Test", "100 MHZ" or "1 GHZ", or any other figure, image or diagram.

In block 440, a selected output waveform signal can be applied to generate a second display pattern in the selectable tracer cable system 100. For example, the second display pattern could be a dynamic or alternating display pattern, such as setting the color of the display member to alternate from a first color to a second color, e.g., alternating between red to green or causing the text "HOT" to flash on and off on a cable that is part of an electrical system in a building or house to warn individuals that come in contact with the electrical cables that this cable is active and carrying power. The use of a dynamic pattern can advantageously cause a cable to visibly stand out regardless of the state of other cables in the system or building. Additionally, the tracer tool can have a strobe setting that could include output signal pulse width selections or settings to generate the on/off duty cycle of the dynamic display patterns. In this way, a short (or long) "on" pulse can be applied to the selectable tracer cable system 100 to allow a user to conserve energy of the power supply. In block 445, the second end of the tracer cable system can be located and serviced. Although the flowchart illustrates applying a first pattern and a second pattern to one of the selectable tracer cable systems 100, it is contemplated that only a single pattern can be applied and that the first pattern can be any of the patterns described above, e.g., the first pattern can be a color pattern, a dynamic pattern or a word status pattern. In embodiments, a group of cables can be energized to change their color along the length of their cables to indicate that the group of cables is to be traced. For example, there is a bundle of fifty cables in a rack and there are four cables that need to be traced. A probe from a tracer tool can be coupled to a bias voltage contact point on each of the four cables to be traced and a bias voltage can be placed on the four desired cables. Next, a technician can locate the opposite ends of the four desired cables located in the cable bundle. Once the group of cables is serviced, the group of cables can be re-energized to reset their color prior to tracing other cables.

The use of the selectable tracer cable system 100 advantageously provides that a single tracer tool can be used to change the state of a group of cables by sequentially touching the bias voltage contacts of each cable individually. Afterwards, the tracer tool can be stored or used for other activities while cable tracing is performed. Although, the operation of the selectable tracer cable system 100 has been mainly in terms of cable tracing in information handling systems, it should not be limited to such information handling systems. To the contrary, the selectable tracer cable system 100 can be applied to tracing electrical wiring in commercial and residential buildings. For example, the selectable tracer cable system 100 could be used in alternating current power systems to enhance safety and shock prevention, or other electrical systems, such as audio, video, alarm systems, control systems, telephony wiring and the like to provide enhanced cable tracing. In the manufacturing environment, another advantage of the selectable tracer cable system 100 is use of color-coded cables without having to stock multiple part numbers. For example, today each color-coded cable of the same cable type, e.g., a Category 5 Ethernet cable, requires its own designated part number. Therefore, if there are currently four color-coded Ethernet cables, e.g., black, yellow, green and blue, then each color-coded Ethernet cable would require its own part number in inventory. However, as the color of the selectable tracer cable system 100 can be set to a specific state, e.g., sheath color, only one Ethernet cable type, i.e., part number, would be in inventory and that Ethernet cable type could be color-coded as part of the manufacturing process.

In embodiments, a tracer tool, such as a selectable tracer cable system tester, can be provided. The tracer tool can include a power supply, a power supply controller, one or more contact probes or clips, a display and a microprocessor. The power supply controller can be a selectable switch configured to provide various output voltages or signals, e.g., a direct current voltage, an alternating voltage, a pulse or step voltage and variations thereof, to cause the tracer cable system 100 to generate various display patterns as previously discussed. In embodiments, the activation circuitry of the tracer tool can be integrated into the interface device 106 or other portion of the tracer cable system 100.

The present invention can be realized in hardware, software, or a combination of hardware and software. An implementation of the method and system of the present invention can be realized in a centralized fashion in one computer system or in a distributed fashion where different elements are spread across several interconnected computer systems. Any kind of computer system, or other apparatus adapted for carrying out the methods described herein, is suited to perform the functions described herein.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

The Abstract is provided to comply with 37 C.F.R. §. 1.72(b) to allow the reader to quickly ascertain the nature and gist of the technical disclosure. The Abstract is submitted with the understanding that it will not be used to interpret or limit the scope or meaning of the claims.

We claim:

1. A selectable tracer cable system, the system comprising:
a cable having a first terminal end and a second terminal;
a display member capable of changing states of appearance in response to an applied voltage, the display member disposed between the first and second terminal ends, the display member comprising:
a first conductive plane;
a second conductive plane opposite the first conductive plane; and,
a plurality of colored microcapsules disposed between the first conductive plane and the second conductive plane;
an interface device, the interface device configured to provide an electrical connection between the display member and a power supply; and,
a core member, the core member disposed within the cable and extending from the first terminal end to the second terminal end;
wherein the interface device comprises:
a first contact point electrically coupled to the first conductive plane; and,
a second contact point electrically coupled to the second conductive plane,
wherein the interface device is externally affixed to a connector coupled to one of the first and second terminal ends.

2. The system of claim 1, wherein the plurality of color microcapsules are electronic ink microcapsules.

3. The system of claim 1, wherein the plurality of color microcapsules include an ink filling.

4. The system of claim 1, wherein the plurality of color microcapsules includes a pigmented chip having a negative charge.

5. The system of claim 1, wherein the plurality of color microcapsules include a microscopic ball having a negative charge, the microscopic ball including a first colored side and a second colored side opposite the first colored side.

6. The system of claim 1, wherein the plurality of color microcapsules are dispersed between the first and second conductive planes to generate a display pattern.

7. The system of claim 6, wherein the display pattern is one of a partial stripe, a dashed line, a partial ring, a ring, a symbol, text, a figure, an image and a diagram.

8. The system of claim 1, further comprising a transparent insulation layer disposed upon the display member, the transparent insulation layer having a display pattern that is printed in fixed ink.

9. A method for tracing cables, the method comprising:
providing a selectable tracer cable system;
coupling a power supply to an interface device coupled to a first terminal end of the selectable tracer cable system; wherein the interface device comprises:
a first contact point electrically coupled to a first conductive plane of a display member; and,
a second contact point electrically coupled to a second conductive plane of the display member,
wherein the interface device is externally affixed to a connector coupled to the first terminal end;
applying a voltage to a first conductive plane of the display member to cause a plurality of microcapsules to change the state of appearance of the display member; and,
generating a display pattern.

10. The method of claim 9, wherein the display pattern is one of a partial stripe, a dashed line, a partial ring, a ring, a symbol, text, a figure, an image and a diagram.

11. The method of claim 9, wherein the generating a display pattern comprises generating a static display pattern.

12. The method of claim 11, wherein the generating a static display pattern comprises applying a direct current voltage to the first conductive plane of the display member.

13. The method of claim 9, wherein the generating a display pattern comprises:
setting a first display pattern of a first cable having a part number to a first color; and,
setting a second display pattern of a second cable having the same part number to a second color.

14. The method of claim 9, wherein the generating a display pattern comprises generating a dynamic display pattern.

15. The method of claim 14, wherein the generating a dynamic display pattern comprises applying an alternating voltage to the first conductive plane of the display member.

16. The method of claim 9, further comprising:
applying a second voltage to the first conductive plane of the display member to cause the plurality of microcapsules to reset the state of appearance of the display member.

17. A tracer tool for use with a selectable tracer cable system, comprising:
a housing;
a power supply coupled to the housing;
a power supply controller electrically coupled to the power supply and configured to manage the output signal generated by the power supply;
an interface device, the interface device configured to provide an electrical connection between at least one tracer cable display member and a power supply, wherein the interface device comprises at least one probe electrically coupled to the power supply and configured to conduct the output signal generated by the power supply to the at least one tracer cable display member, wherein the interface device is externally affixed to a connector coupled to one of the first and second terminal ends of the tracer cable; and,
a display panel coupled to the housing and electrically coupled to a microprocessor.

* * * * *